(12) United States Patent
English

(10) Patent No.: US 12,102,072 B1
(45) Date of Patent: Oct. 1, 2024

(54) MECHANICAL FISHING LURE DEVICE WITH MAGNET ENABLED RETRACTABLE HOOK

(71) Applicant: Danny Ray English, Caret, VA (US)

(72) Inventor: Danny Ray English, Caret, VA (US)

(*) Notice: Subject to any disclaimer, the term of this patent is extended or adjusted under 35 U.S.C. 154(b) by 0 days.

(21) Appl. No.: 17/552,531

(22) Filed: Dec. 16, 2021

Related U.S. Application Data

(60) Provisional application No. 63/126,514, filed on Dec. 16, 2020.

(51) Int. Cl.
  *A01K 85/02* (2006.01)
  *A01K 85/00* (2006.01)
  *A01K 85/16* (2006.01)

(52) U.S. Cl.
  CPC ............ *A01K 85/028* (2022.02); *A01K 85/02* (2013.01); *A01K 85/16* (2013.01)

(58) Field of Classification Search
  CPC ...... A01K 85/00; A01K 85/02; A01K 85/021; A01K 85/023; A01K 85/026; A01K 85/027; A01K 85/028; A01K 85/1851; A01K 85/1857; A01K 83/02; A01K 83/025; A01K 83/045; A01K 83/067; A01K 85/16
  USPC .......... 43/34, 35, 36, 37, 42.08, 42.41, 42.1, 43/42.36
  See application file for complete search history.

(56) References Cited

U.S. PATENT DOCUMENTS

| | | | | |
|---|---|---|---|---|
| 1,021,699 A | * | 3/1912 | Nordlund | A01K 85/02 43/37 |
| 1,758,817 A | * | 5/1930 | Babbitt | A01K 85/02 43/42.48 |
| 1,890,266 A | * | 12/1932 | Schadkll | A01K 85/02 43/37 |
| 2,205,773 A | * | 6/1940 | Fox | A01K 85/16 43/37 |
| 2,613,469 A | * | 10/1952 | Haberkorn | A01K 85/02 43/35 |
| 2,727,329 A | * | 12/1955 | Robinson | A01K 85/16 43/35 |
| 2,871,608 A | * | 2/1959 | Fisher | A01K 85/02 43/35 |
| 3,411,233 A | * | 11/1968 | Hopper | A01K 85/02 43/37 |
| 3,665,634 A | * | 5/1972 | Baud | A01K 85/02 43/37 |
| 4,175,348 A | | 11/1979 | Ray | |
| 4,176,489 A | * | 12/1979 | Levstik | A01K 85/02 43/35 |
| 4,777,758 A | | 10/1988 | Phillips | |

(Continued)

*Primary Examiner* — Darren W Ark
*Assistant Examiner* — Kevin M Dennis
(74) *Attorney, Agent, or Firm* — Cramer Patent & Design PLLC; Aaron R. Cramer

(57) ABSTRACT

The mechanical fishing lure device may comprise a body, a hook, an axle, and a magnet. The mechanical fishing lure device may be a fishing lure adapted for attracting fish. The body may conceal the hook in a retracted position. An individual fish may strike at the fishing lure and may pull the body of the fishing lure while the fishing lure is in the mouth of the individual fish. A strike force exceeding a predetermined force threshold may pull the body against a fishing line causing the hook to pivot to an exposed position. The hook may be adapted to impale the individual fish when the hook is in the exposed position during a strike.

1 Claim, 4 Drawing Sheets

(56) References Cited

U.S. PATENT DOCUMENTS

| | | | | |
|---|---|---|---|---|
| 4,782,618 A * | 11/1988 | Rainey | A01K 85/02 43/37 |
| 4,827,656 A * | 5/1989 | Ohnishi | A01K 85/02 43/34 |
| 5,155,947 A * | 10/1992 | Rivard | A01K 85/01 43/42.06 |
| 5,218,778 A * | 6/1993 | Szantor | A01K 85/02 43/42.52 |
| 5,367,818 A * | 11/1994 | Aduana | A01K 85/02 43/42.44 |
| 5,822,911 A * | 10/1998 | Cox | A01K 85/02 43/37 |
| 5,890,314 A * | 4/1999 | Peters | A01K 85/02 43/37 |
| 5,924,236 A | 7/1999 | Preston | |
| 6,574,907 B1 * | 6/2003 | Mitton | A01K 85/02 43/37 |
| 6,651,375 B2 * | 11/2003 | Parrish | A01K 85/02 43/37 |
| 6,671,996 B1 | 1/2004 | Ito | |
| 6,772,552 B2 * | 8/2004 | Parrish | A01K 85/02 43/37 |
| 6,862,836 B1 * | 3/2005 | Ridings | A01K 85/02 43/37 |
| 6,931,783 B1 * | 8/2005 | Faulkner | A01K 85/02 43/35 |
| 7,698,852 B1 * | 4/2010 | Cox | A01K 91/10 43/37 |
| 8,371,060 B2 * | 2/2013 | Odem | A01K 85/02 43/34 |
| 8,677,676 B2 * | 3/2014 | Eikebrokk | A01K 85/01 43/26.2 |
| 8,689,479 B1 * | 4/2014 | Smith | A01K 85/02 43/37 |
| 8,904,700 B1 * | 12/2014 | Kacines | A01K 85/005 43/43.12 |
| 8,925,241 B1 * | 1/2015 | Smith | A01K 85/02 43/37 |
| 9,101,122 B2 * | 8/2015 | Odem | A01K 85/02 |
| 9,872,484 B1 * | 1/2018 | Johnson | A01K 83/02 |
| 10,285,389 B2 * | 5/2019 | Brandt | A01K 97/06 |
| 10,477,844 B2 * | 11/2019 | Low | A01K 85/02 |
| 11,000,022 B2 | 5/2021 | Choi | |
| 2003/0051389 A1 * | 3/2003 | Parrish | A01K 85/02 43/37 |
| 2003/0177687 A1 * | 9/2003 | Parrish | A01K 85/02 43/37 |

* cited by examiner

MECHANICAL FISHING LURE DEVICE WITH MAGNET ENABLED RETRACTABLE HOOK

RELATED APPLICATIONS

The present invention was first described in and claims the benefit of U.S. Provisional Application No. 63/126,514, filed Dec. 16, 2020, the entire disclosures of which are incorporated herein by reference.

FIELD OF THE INVENTION

The present invention generally relates to fishing lures, and more particularly to a mechanical fishing lure device with magnet enabled retractable hook, and the like.

BACKGROUND OF THE INVENTION

Recreational In recent years, various fishing lures have emerged. However, such lures have issues with safety, entanglement, realism, and the like.

SUMMARY OF THE INVENTION

The Therefore, there is a need for devices that address the above, and other problems. The above and other problems are addressed by the illustrative embodiments of the present invention, which provide a mechanical fishing lure device with magnet enabled retractable hook, and the like, that is safe, is free from entanglement, achieves realism, and the like. Accordingly, in illustrative aspects of the present invention there is provided a mechanical fishing lure device with magnet enabled retractable hook, comprising one or more of the features, sub-features and/or devices, as described with respect to FIGS. 1-3C.

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
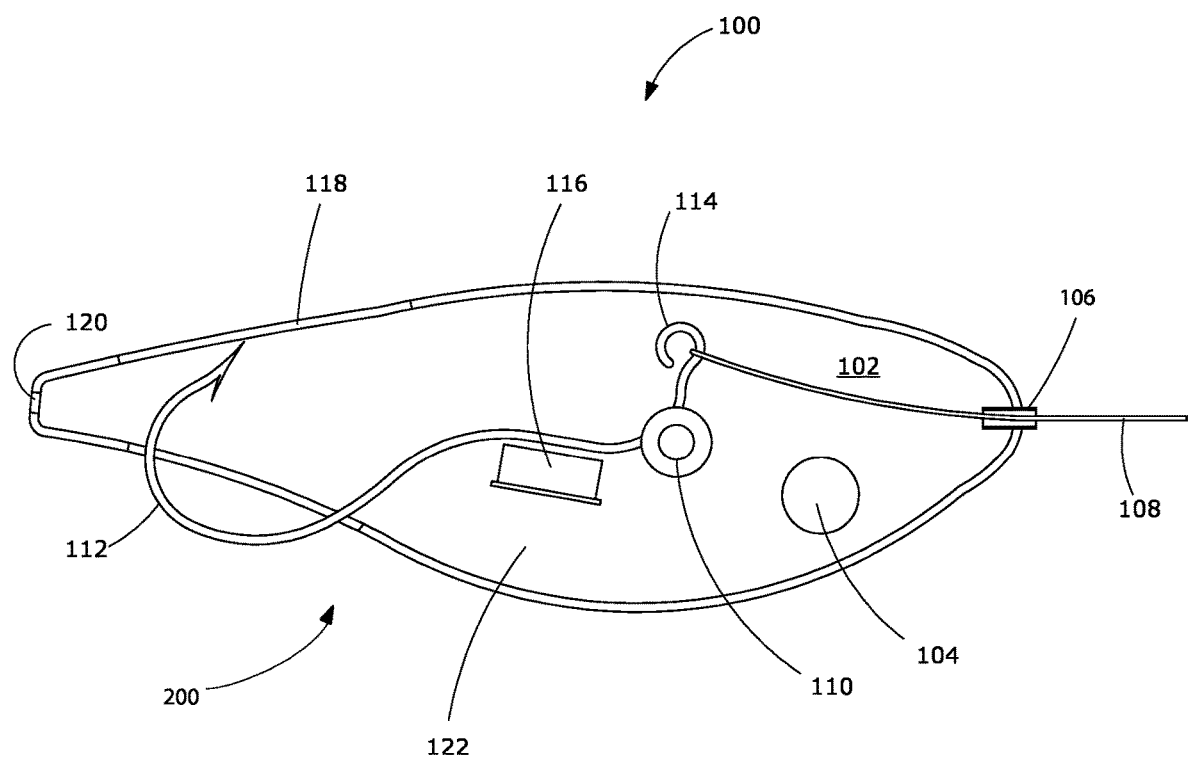
FIG. 1 is a side detail view of a mechanical fishing lure device, according to an embodiment of the present invention, illustrating the hook in the retracted position.
Figure 2:
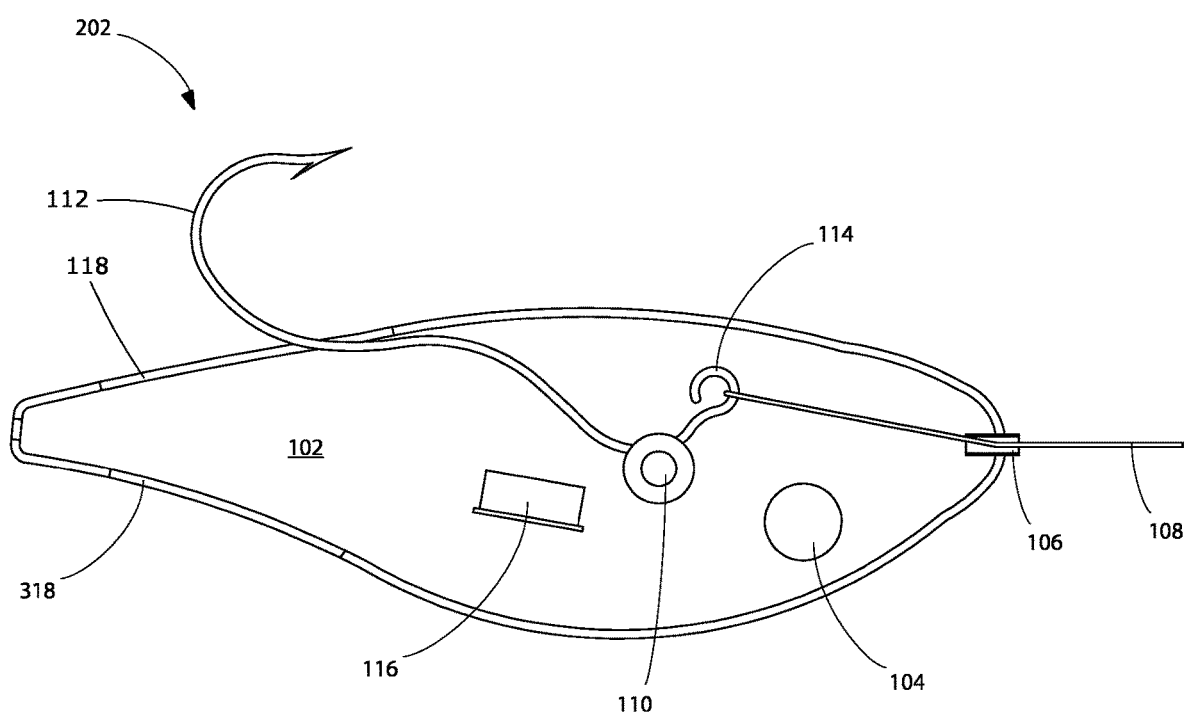
FIG. 2 is a side detail view of a mechanical fishing lure device, according to an embodiment of the present invention, illustrating the hook in the exposed position.
Figure 3A:
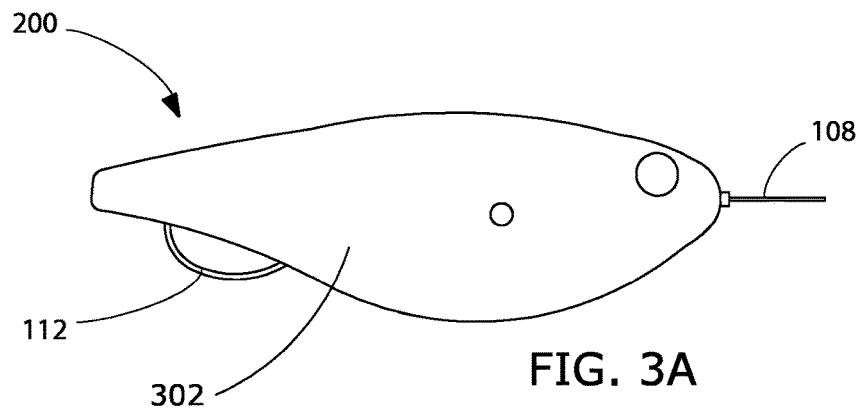
FIG. 3A is a side view of a mechanical fishing lure device, according to an embodiment of the present invention, illustrating the hook in the retracted position.
Figure 3B:
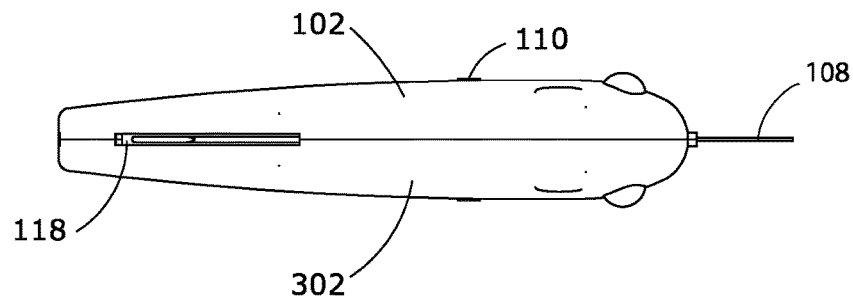
FIG. 3B is a top view of a mechanical fishing lure device, according to an embodiment of the present invention.
Figure 3C:
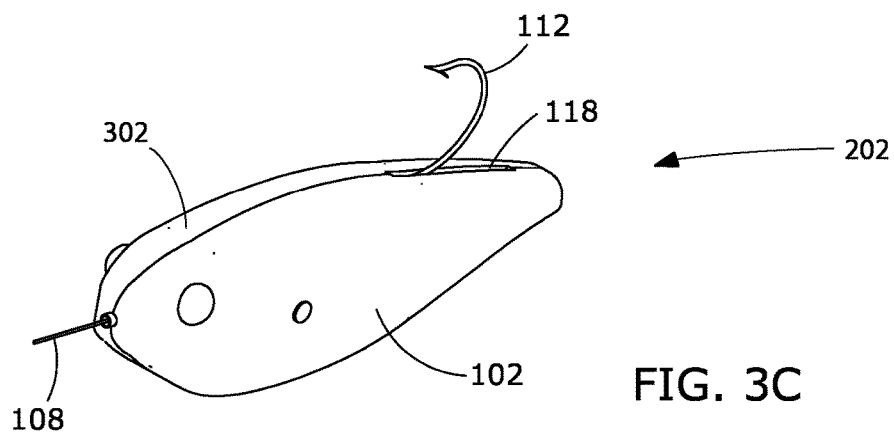
FIG. 3C is an isometric view of a mechanical fishing lure device, according to an embodiment of the present invention, illustrating the hook in the exposed position.
Figure 3D:
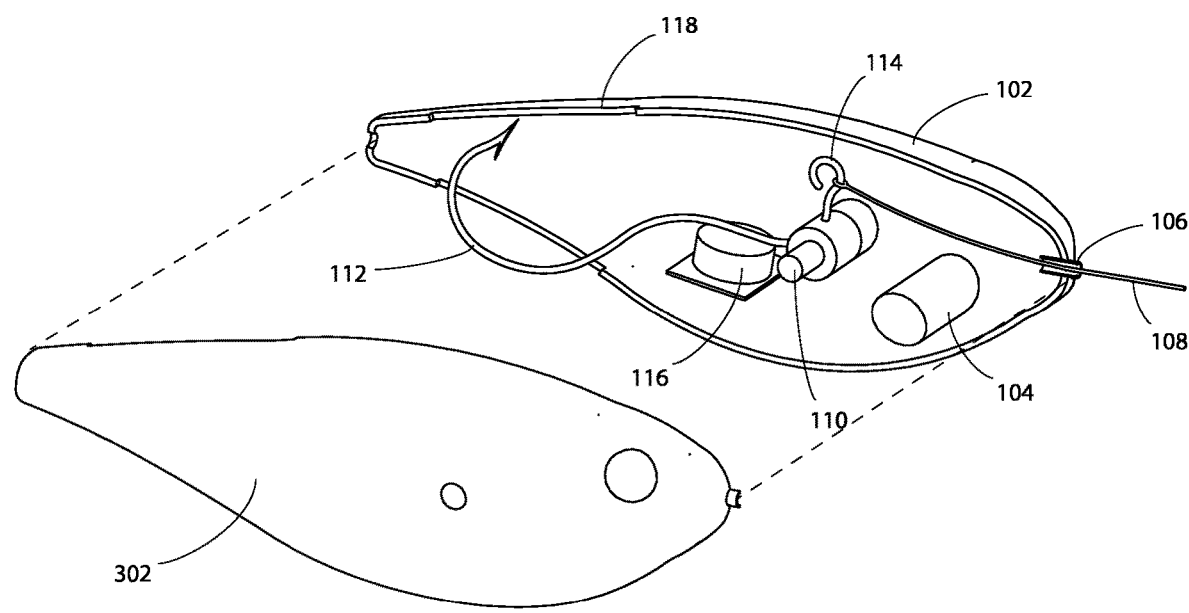
FIG. 3D is an exploded view of a mechanical fishing lure device, according to an embodiment of the present invention.

DESCRIPTIVE KEY 100 mechanical fishing lure device
102 first half body section
104 ballast
106 fishing line guide tube
108 fishing line
110 axle
112 hook
114 eye
116 magnet
118 slot
120 tail hole
122 scent cavity
200 retracted position
202 exposed position
302 second half body section
318 counter-slot

DESCRIPTION OF THE INVENTION

The present invention is directed to a mechanical fishing lure device (herein described as the "invention") 100. The invention 100 may comprise a body, a hook 112, an axle 110, and a magnet 116. The invention 100 may be a fishing lure adapted for attracting fish. The body may conceal the hook 112 in a retracted position 200. An individual fish may strike at the fishing lure and may pull the body of the fishing lure while the fishing lure is in the mouth of the individual fish. A strike force exceeding a predetermined force threshold may pull the body against a fishing line 108 causing the hook 112 to pivot to an exposed position 202. The hook 112 may be adapted to impale the individual fish when the hook 112 is in the exposed position 202 during a strike.

The body may comprise a first half body section 102 and a second half body section 302. The first half body section 102 may couple to the second half body section 302. As a non-limiting example, the body may resemble a small fish shape or some other appetizing meal for the individual fish. The first half body section 102 may detach from the second half body section 302 such that the fishing line 108 may be attached to the hook 112. As a non-limiting example, the first half body section 102 and the second half body section 302 may snap lock together and may pry apart. The body may be a housing for the hook 112, the axle 110, and the magnet 116.

The body may comprise a slot 118. The slot 118 may be a longitudinal gap between the first half body section 102 and the second half body section 302. The slot 118 may provide clearance for the hook 112 to pivot from the retracted position 200 to the exposed position 202 such that the hook 112 moves from the interior of the body to the exterior of the body.

In some embodiments, the body may provide a counter-slot 318. The counter-slot 318 may be a longitudinal gap between the first half body section 102 and the second half body section 302 located on the opposite side of the body from the slot 118. The counter-slot 318 may provide clearance for a bend of the hook 112 to exit the body when the hook 112 is in the retracted position 200.

The hook 112 may be a tool adapted for catching fish. The hook 112 may comprise a tip, a barb, the bend, a shank, and an eye 114. The hook 112 may be pivotably coupled to the first half body section 102 via the axle 110. The eye 114 may be bent to form an angle with the shank such that the eye 114 is oriented to point towards the top of the body when the hook 112 is in the retracted position 200. In some embodiments, the eye 114 may be bent to form a right angle with the shank.

The hook 112 may be retained in the retracted position 200 by the magnet 116. The magnet 116 may be coupled to the first half body section 102 and may be positioned within the body such that the hook 112 makes contact with the magnet 116 when the tip and the barb of the hook 112 are entirely within the body. The hook 112 may be magnetic such that the hook 112 is retained in the retracted position 200 by the magnet 116.

The fishing line 108 may pass into the body through the front of the body and may be coupled to the eye 114. The hook 112 may separate from the magnet 116 and may pivot to the exposed position 202 when the body and the fishing line 108 are pulled in opposite directions by the strike force exceeding the predetermined force threshold.

A ballast 104 may be weight added within the body. In embodiments, the weight and positioning of the ballast 104 may be modified to control buoyancy and center of gravity of the fishing lure. As a non-limiting example, the ballast 104 may keep the body floating in an orientation such that the small fish shape that the body may be intended to resemble appears to be swimming upright.

In some embodiments, the body may comprise a tail hole 120 located at the rear of the body. The tail hole 120 may be operable to couple lure attachments to the body. As non-limiting examples, the lure attachments may comprise tails, streamers, and luring devices. In some embodiments, the tail hole 120 may be threaded to facilitate coupling the lure attachments.

In some embodiments, the interior of the body may be operable as a scent cavity 122. The scent cavity 122 may be adapted to hold a scent-absorbent material that may contain a scent agent. As non-limiting examples, the scent-absorbent material may comprise cotton, foam, leather, suede, fur, yarn, or any combination thereof. As a non-limiting example, the scent agent may be a water soluble substance that attracts fish. When the body is moved through the water with the scent-absorbent material and the scent agent in the scent cavity 122, the body may readily attract fish.

In some embodiments, the invention 100 may comprise a fishing line guide tube 106. The fishing line guide tube 106 may shield the fishing line 108 from the body where the fishing line 108 enters the body. The fishing line guide tube 106 may protect the fishing line 108 from abrasive damage and/or may reduce friction between the fishing line 108 and the body.

Advantageously, the invention 100 may not tangle with other lures, lines, and other fishing gear while being transported since the hook 112 is maintained in the retracted position 200 by the magnet 116. The invention 100 may be safe to carry since the hook 112 is maintained in the retracted position 200 by the magnet 116 and therefore not exposed to cause injury. The invention 100 may hide, dive, and swim with the ballast 104 suitably configured and when slack in the fishing line 108 is provided. The invention 100 may swim through weeds and other obstacles without snagging with the hook 112 maintained in the retracted position 200. The invention 100 may be made to float with the ballast 104 suitably configured and/or with air captured within the body.

The invention 100 may incorporate other shapes that may be attractive as bait. As non-limiting examples, the body may be shaped like a reptile, a minnow, a small bird, or another species of fish. The invention 100 may be configured as a broken back lure. As used herein, "broken back lure" may refer to a fishing lure that is articulated by dividing the body of the fishing lure transversely and loosely coupling the body sections such that the body may bend up and down and/or side-to-side.

The invention 100 may be adapted to attract fish due to the hook 112 not being exposed until the individual fish strikes and the fishing line 108 is pulled. The invention 100 may be adapted for catching all types of fish and other aquatic animals with suitable selection and configuration of strength of the magnet 116, the hook 112, and the fishing line 108.

The invention 100 may be adapted to be easily and safely removed from the fish, simply by grabbing the body of the invention 100 and pushing inward towards the mouth of the fish.

The invention 100 may be self-resetting (i.e., the magnet 116 may automatically retain the hook 112 in the retracted position 200).

In use, the body of the fishing lure may be opened by removing the second half body section 302 and the fishing line 108 may be inserted into the body through the fishing line guide tube 106 and coupled to the eye 114 of the hook 112. The hook 112 may be moved to the retracted position 200 by pivoting the hook 112 such that the shank of the hook 112 contacts the magnet 116. If the scent agent is to be used, the scent agent may be applied to the scent-absorbent material and the scent-absorbent material may be placed into the scent cavity 122. The second half body section 302 may be replaced to close the body.

The fishing lure may be cast into the water at the end of the fishing line 108. When an individual fish strikes, the individual fish may pull the body against the fishing line 108 and may exert a strike force that exceeds the predetermined force threshold. The strike force may pull the shank of the hook 112 away from the magnet 116 and may cause the hook 112 to pivot from the retracted position 200 to the exposed position 202. In the exposed position 202, the hook 112 may be exposed and may impale the individual fish and the individual fish may then be reeled in.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:
1. A mechanical fishing lure device, comprising:
a body comprising: a front; a rear; a longitudinal axis extending between the front and rear; a first half body section; a second half body section; a slot defined along a top of the body as a first gap between the first and second half body sections; and, a counter-slot defined along a bottom of the body as a second gap between the first and second half body sections, said body further comprising an interior designed to facilitate a floating orientation and adapted to function as a scent cavity, constructed to hold a scent-absorbent material imbued with a scent agent, providing a means of attracting fish through olfactory stimulation;

a hook pivotably coupled to the first half body section via an axle such that the hook can move between retracted and exposed positions thereof, the hook comprising: a tip; a barb; a bend; a shank; and, an eye bent to form an angle with the shank, wherein said eye is configured to orient the hook tip towards the top of the body in the retracted position, providing a streamlined profile that mimics natural prey; the slot providing clearance for the hook to transition between the retracted and exposed positions and the counter-slot granting a clearance for the bend of the hook when the hook is in the retracted position; wherein in the retracted position of the hook, the hook tip is located within the interior of the body just below the slot and the hook bend extends outwardly through the counter-slot and below the body; and wherein in the exposed position of the hook, the hook tip and hook bend extend outwardly through the slot and above the body;

a magnet positioned within the first half body section below the hook shank and above the bottom of the body, the magnet having an upper planar surface which is at an angle to the longitudinal axis of the body, the magnet securing the hook at the hook shank in the retracted position by magnetic attraction, wherein the placement and strength of the magnetic attraction are optimized to maintain the hook in the retracted position until overcome by a strike force which causes the hook to move to the exposed position;

a cylindrical-shaped ballast located within the interior of the body and extending perpendicular to the longitudinal axis of the body, adapted to control a buoyancy and define a center of gravity of the fishing lure device, wherein said ballast is specifically arranged to cause the body to mimic a swimming motion of live prey in an upright orientation, providing an illusion of life-like swimming action;

a tail hole situated at the rear of the body, structured and arranged to couple lure attachments to the body;

a fishing line guide tube at the front of the body designed to shield a fishing line connected to the hook eye from the body at a point of entry into the interior of the body, reducing wear on the fishing line and preserving an integrity of the fishing line;

a snap-locking mechanism comprising connectors enabling each of the first and second half body sections to securely lock together and be pried apart; and, wherein the first half body section and the second half body section are configured to snap-lock together using the connectors, facilitating ease of assembly and maintenance;

wherein the ballast is located both along the longitudinal axis of the body between the fishing line guide tube and the axle and below the fishing line guide tube and the axle;

wherein the scent cavity of the interior of the body includes the absorbent material that retains the scent agent for prolonged release, enhancing the effectiveness of the lure device in attracting fish; and, wherein the hook is magnetically retained in the retracted position with the magnetic attraction of the magnet being sufficient to prevent accidental exposure of the hook but can be released by the strike force exceeding a predetermined threshold of the magnetic attraction which causes the hook to move to the exposed position, ensuring reliability during fishing activities.

\* \* \* \* \*